United States Patent
Falck-Schmidt

(10) Patent No.: US 8,025,753 B2
(45) Date of Patent: Sep. 27, 2011

(54) METHOD FOR MANUFACTURING A VEHICLE COMPRISING CARBON FIBRE

(75) Inventor: Jan Falck-Schmidt, Odense C (DK)

(73) Assignee: FALCK SCHMIDT Defence Systems A/S, Odense C (DK)

( * ) Notice: Subject to any disclaimer, the term of this patent is extended or adjusted under 35 U.S.C. 154(b) by 31 days.

(21) Appl. No.: 12/311,957

(22) PCT Filed: Oct. 19, 2007

(86) PCT No.: PCT/DK2007/000450
§ 371 (c)(1),
(2), (4) Date: Apr. 20, 2009

(87) PCT Pub. No.: WO2008/064676
PCT Pub. Date: Jun. 5, 2008

(65) Prior Publication Data
US 2010/0024965 A1    Feb. 4, 2010

(30) Foreign Application Priority Data
Oct. 20, 2006 (DK) .................. 2006 01358

(51) Int. Cl.
*B65H 81/00* (2006.01)
(52) U.S. Cl. .......... 156/171; 156/173; 156/174; 156/175
(58) Field of Classification Search .......... 156/173–175, 156/184–195, 171
See application file for complete search history.

(56) References Cited

U.S. PATENT DOCUMENTS

| | | | |
|---|---|---|---|
| 3,449,484 A | 6/1969 | Medney | |
| 3,655,468 A * | 4/1972 | Bastone et al. | 156/62.2 |
| 3,783,060 A * | 1/1974 | Goldsworthy et al. | 156/69 |
| 4,813,334 A * | 3/1989 | Bloks et al. | 89/36.02 |
| 5,365,662 A * | 11/1994 | Anderegg | 29/897.2 |
| 5,533,781 A | 7/1996 | Williams | |
| 6,183,834 B1 * | 2/2001 | van der Loo | 428/107 |
| 6,361,635 B1 * | 3/2002 | Ayorinde | 156/169 |
| 6,490,990 B1 | 12/2002 | Hamlyn et al. | |
| 6,709,736 B2 | 3/2004 | Gruber et al. | |
| 7,096,814 B1 | 8/2006 | Webb | |
| 7,101,435 B2 * | 9/2006 | Zhang et al. | 117/91 |
| 2003/0064191 A1 * | 4/2003 | Fisher | 428/49 |
| 2005/0188831 A1 | 9/2005 | Squires et al. | |
| 2006/0054742 A1 * | 3/2006 | Druckman et al. | 244/118.5 |

FOREIGN PATENT DOCUMENTS

| | | |
|---|---|---|
| DE | 2941854 | 4/1980 |
| DE | 2921854 C1 | 11/1990 |
| DE | 10 2004 019 400 | 11/2005 |
| EP | 0 994 084 B1 | 4/2000 |
| GB | 2 028 708 A | 3/1980 |
| GB | 2156272 A * | 10/1985 |

* cited by examiner

*Primary Examiner* — Jeff Aftergut
(74) *Attorney, Agent, or Firm* — James Creighton Wray

(57) ABSTRACT

There is described a method for making a vehicle (2), including a body comprising carbon fibres, preferably a military vehicle. The method consists of the body being wound up over a mandrel with threads (28) wetted in glue. The threads (28) contain carbon fibres. The threads (28) wound around the mandrel (22) are subsequently cured. After the curing, the body is drawn off the mandrel (22), and the ends of the body are cut off at appropriate angles. Then the front end and rear end of the body are closed with closure elements, preferably closure elements containing carbon fibres and armouring materials. During the winding process, one or more layers of lightweight ceramic and/or other armouring materials (26) are laid in, which thereby become integrated in the basic body.

8 Claims, 4 Drawing Sheets

METHOD FOR MANUFACTURING A VEHICLE COMPRISING CARBON FIBRE

This application claims the benefit of Danish Application No. PA 2006 01358 filed Oct. 20, 2006 and PCT/DK2007/000450 filed Oct. 19, 2007, which are hereby incorporated by reference in their entirety.

FIELD OF THE INVENTION

The present invention concerns a method for making a vehicle including a body comprising carbon fibres, where the body is wound up on a mandrel with threads wetted in glue, where the threads contain carbon fibres, where the threads wound around the mandrel are subsequently cured where, after the curing, the body is drawn off the mandrel, where the front end and rear end of the body are closed with closure elements.

BACKGROUND OF THE INVENTION

In connection with making military armoured vehicles, it is attempted to reduce the weight of the vehicle in relation to the load carrying ability of the vehicles. Low weight is necessary in order to move the vehicles by air. At the same time, good armouring is required. Conventional armoured vehicles, including road vehicles, are mainly built of armoured steel for protection and carrying ability.

In order to reduce the self-weight simultaneously with maintaining the load carrying ability and ability of bearing armour, respectively, it is required to use materials with great strength compared to the density of the materials. For that purpose, carbon fibres have appeared to have the required material properties. Until now, the production of armoured vehicles has been based on using moulding tools corresponding to those used in the production of glass fibre boats. The production of vehicles containing carbon fibres has thus consisted in initially laying mats of carbon fibre in moulds and subsequently adding a special glue (resin/matrix), after which the materials are cured under vacuum and temperature (possibly autoclave with overpressure). This process is relatively costly due to the required use of expensive tools (including autoclave) and the manual handling. Besides, the complicated moulding tools have given rise to substantial expenses in production. Often there is used a body consisting Of a number of parts which are to be assembled subsequently. Control of the tolerances of the finished product, especially on the side facing away from the moulding tool, is hereby made difficult.

U.S. patent application 2005/0188831 describes a resistant tower for use in connection with a military vehicle, and a method for making such a tower. The tower has walls around which fibres are wrapped. In the patent application is mentioned that they may be carbon fibre threads. The method includes weaving fibres (impregnated with adhesive resin) around a mould. This publication describes use of carbon fibre threads in connection with the making of individual subelements, such as a tower. In connection with constructing armoured vehicles, it will be expedient to enable making the largest possible part of the vehicle in one and the same procedure.

U.S. Pat. No. 6,490,990 describes a method of the type described in the introduction for making a floating object. In this publication, there is thus a description of method steps where threads wetted in glue are wrapped over a mandrel and subsequently cured. There is no mentioning of finishing treatment after curing for handling the cured structure with regard adaptation to specific applications.

U.S. Pat. No. 5,365,662 describes a method of the type described in the introduction. This document describes a method in which a railway coach is manufactured. The document mentions that a curing is effected and that the mandrel is supplied with a front and rear end in form of closure elements.

This document does not disclose specific form for the cut-off in order to establish the possibility of cut-offs for specific purposes. Moreover, there is no disclosure of a method for making a vehicle which is different from the railway coach.

Especially there is no mentioning of specific methods or features in a method which is necessary for providing a vehicle suitable for military purposes.

OBJECT OF THE INVENTION

The object of the present invention is to indicate a method for making a vehicle with low weight compared with steel or aluminium frames, with great uniformity of the final structure, with few joints and with low tool expenses and possibility of handling the cured structure with regard to adaptation to specific applications especially military purposes.

DESCRIPTION OF THE INVENTION

According to the present invention this is achieved by a method of the type mentioned by way of introduction which is peculiar in that the ends of the body are cut off at appropriate angles, and that the closure elements contain carbon fibres and armouring materials and that during the winding process, one or more layers of light weight ceramic and/or other armouring materials are laid in which thereby become integrated in the basic body.

The invention is advantageous because the body may achieve a high degree of armouring. This may be necessary when the vehicle is to be used for military purposes. It is possible to provide various degrees of armouring in various parts of the body by varying the number, the thickness and the nature of the applied layers of armouring materials.

The curing may e.g. be effected by heating, e.g. in an oven.

By a method according to the invention there is thus achieved an advantage, as the weight of the vehicle is reduced. By air transport, the weight of the vehicles will be decisive. Thus it will be possible to transport the vehicle by air, e.g. in connection with remote areas of action.

At the same time, the method is cheaper than the traditional methods of manufacture due the much reduced tool expenses, i.a. because the curing is effected without using an autoclave for applying overpressure. Also, the need for manual handling becomes unnecessary. It is furthermore an advantage that great uniformity can be attained with regard to the final structure. It is an additional advantage that the larger part of the vehicle can be produced in one procedure. An additional advantage is achieved as prestressed fibres can be used in connection with the winding. Hereby optimal possibilities for controlling the fibre directions are achieved.

By a method according to the present invention is achieved the possibility of adapting the body to specific applications. Advantageously, closure elements containing armouring material can be used for increasing the strength of the vehicle. It is furthermore possible subsequently to cut out areas of the body for e.g. windows, openings, doors or other devices.

According to yet an embodiment, the present invention is peculiar in that mounting agents may be put on the mandrel, whereafter mounting means are fitted, where mounting agents and means are cleaned from threads and glue after the winding process, where the body is subsequently surface treated or coated. Hereby is achieved the possibility of providing a large number of necessary mountings both before and after winding the body. Mounting means may e.g. consist of a lightweight metal frame on which means, such as wheel suspensions, can be mounted afterwards. Also, more refined devices of more complicated nature may also be provided. It is possible to produced a frame, e.g. in aluminium, which can be wound into the fibre structure.

According to yet an embodiment, the present invention is peculiar in that after the surface treatment of the body, mounting elements may be fitted. Hereby is achieved possibility of providing a number of required devices, e.g. in the form of mounting elements, such as motor, gearbox and additional armour. This enables constructing a functional and top modern vehicle.

The vehicle may e.g. be a military vehicle, an armoured military vehicle, a military aircraft or an armoured military aircraft. The present invention provides possibility of providing vehicles which are specifically adapted to the needs prevailing in military applications.

DESCRIPTION OF THE DRAWING

The invention will now be explained below with reference to the accompanying schematic drawing, where:

FIG. 3 is seen from above; FIG. 4 is seen from above.

DETAILED DESCRIPTION OF THE INVENTION

Firstly, it is to be noted that the attached drawing only illustrates non-limiting embodiments of the invention. A number of other embodiments will be possible within the scope of the present invention. In the following description, identical or corresponding elements in the various embodiments will be provided with the same designations below.

Figure 1:
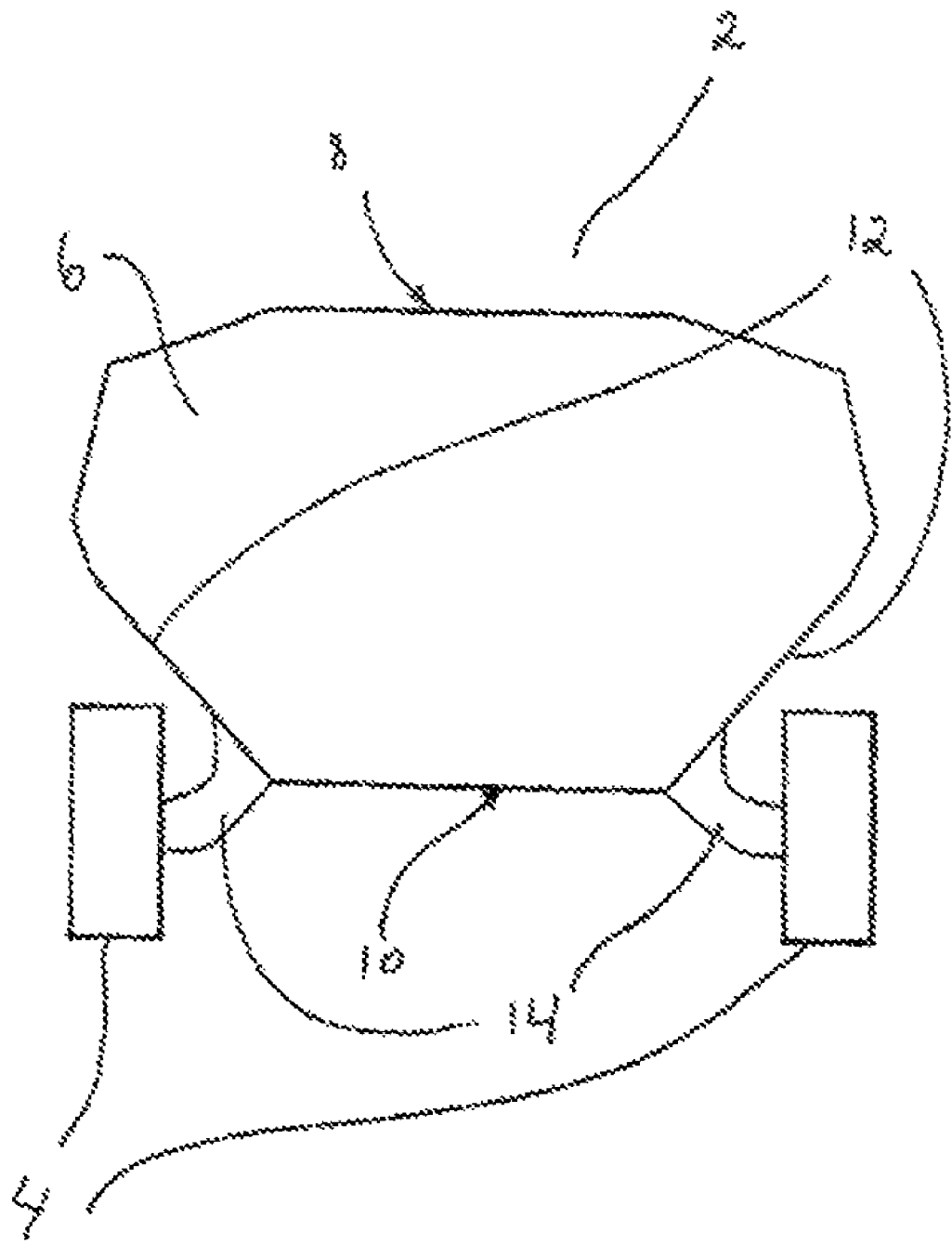
FIG. 1 shows a schematic view of an embodiment of a military vehicle according to the invention, as seen from behind.

FIG. 1 shows a rear view of a military vehicle 2. The vehicle comprises a body 6 with a diagonal cross-section, where both the top surface 8 and the bottom surface 10 are horizontally oriented. The bottom face 10 adjoins the obliquely extending side faces 12. At the end of the side faces 12 situated closest to the bottom face 10, wheel suspensions 14 are attached on which wheels 4 are rotatably mounted. On FIG. 1, only two wheels 4 are visible. It is to be emphasised that the bottom face 10 may have other shapes, including a curving shape or a V-shape. A V-shaped bottom face 10 may in some situations be preferred, because a V-shaped bottom plate 10 may deflect a pressure wave to a higher degree than e.g. a horizontal bottom face 10.

Figure 2:
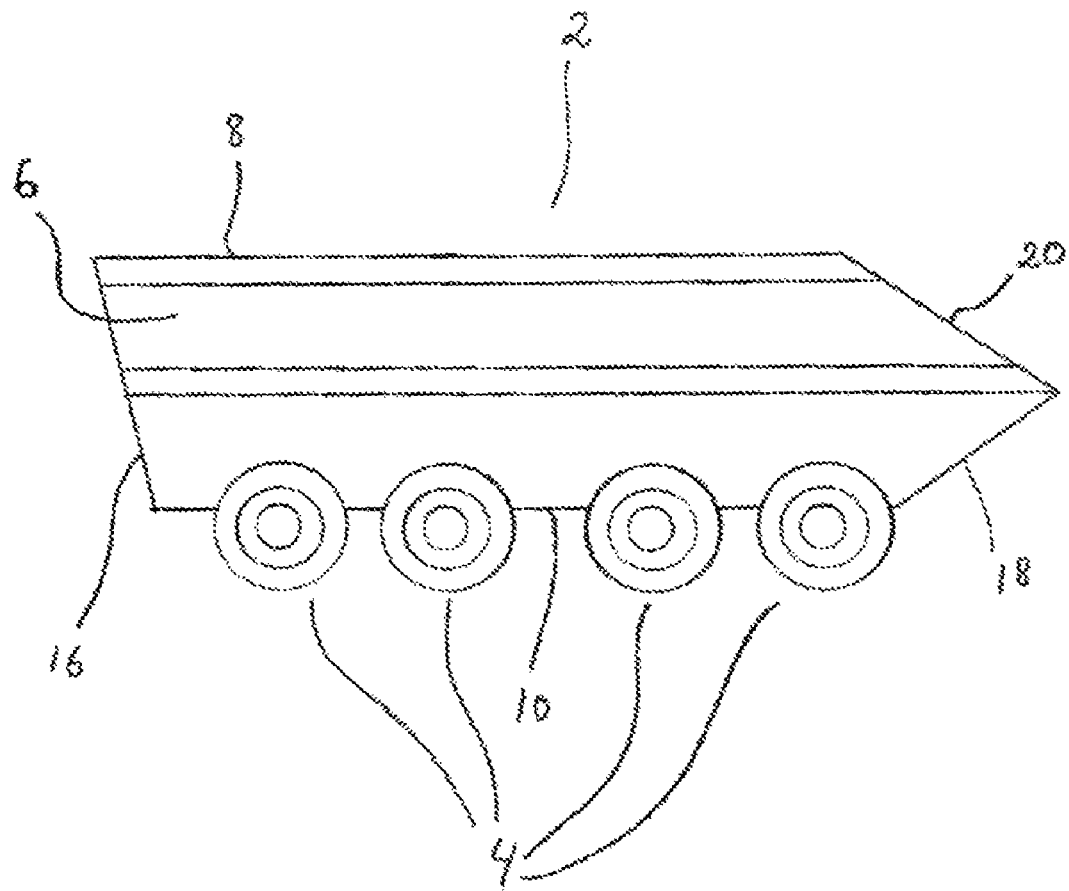
FIG. 2 shows the military vehicle shown in FIG. 1 as seen from the side.

On FIG. 2, the military vehicle 2 shown in FIG. 1 is illustrated. The view is seen from the side. The vehicle includes a body 6 with a horizontally oriented top face 8 and bottom face 10. The bottom face 10 adjoins a rearwards inclining back face 16 and a forwards inclining front face 18 adjoining a rearwards inclining oblique face 20 that abuts on the top face 8. At each side of the vehicle 2, four wheels 4 are rotatably fastened in wheel suspensions. It is to be noted that both the bottom face 10 and the top face 8 may have other shapes. It is e.g. possible to use a curving shape or a V-shape.

Figure 3:
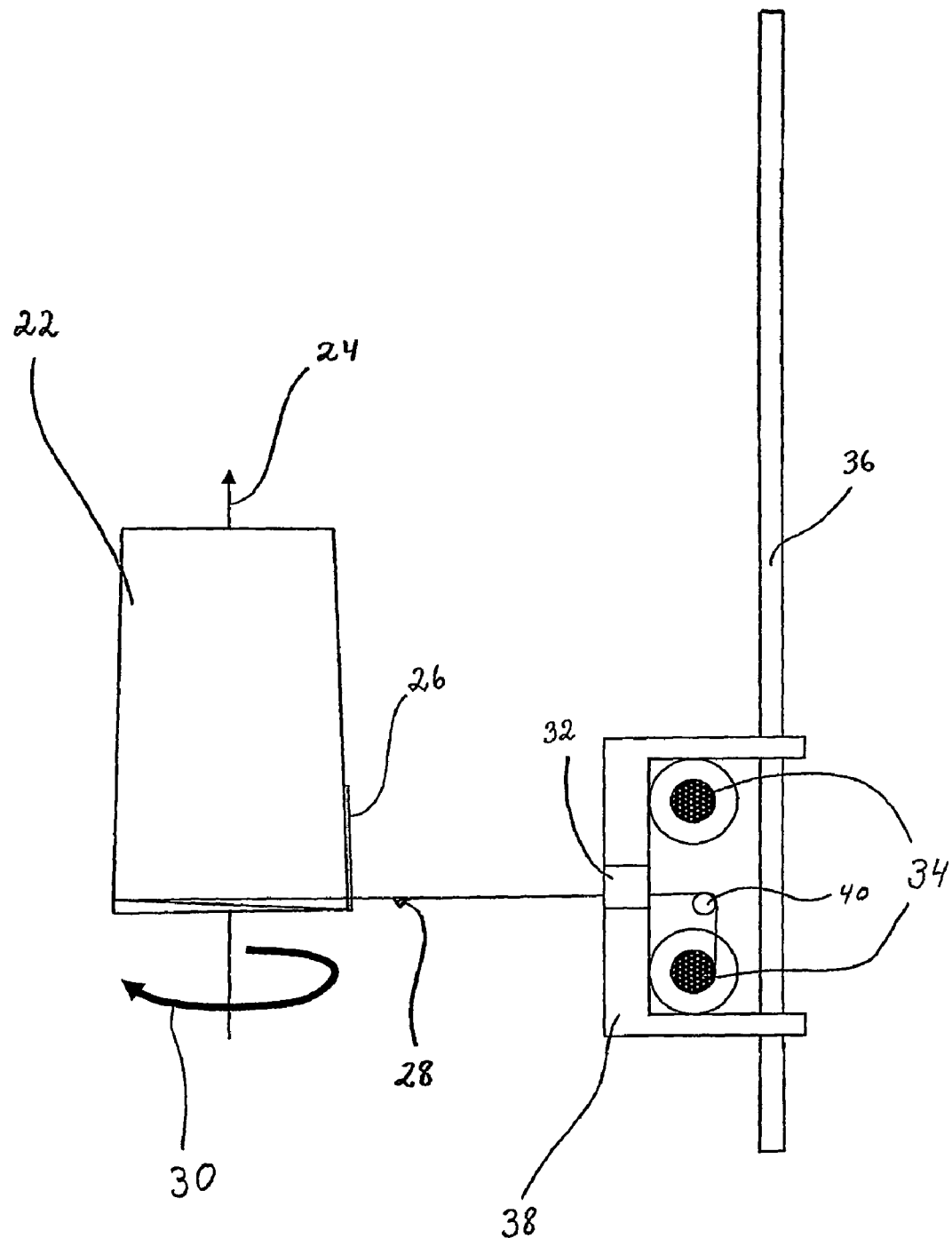
FIG. 3 shows a mandrel about which a thread is wound.

FIG. 3 illustrates a mandrel 22 around which carbon fibre threads 28 are wound. The mandrel 22 rotates about a horizontal axis 24 in the theoretical centre axis of the vehicle in longitudinal direction. The direction of rotation 30 corresponds to the mandrel 22 being wrapped with carbon fibre threads 28. There is =provided a piece of lightweight ceramic armouring material 26. It is to be noted that carbon fibre threads 28 may advantageously be wound around the mandrel 22 at both sides of the armouring material 26. The armouring material 26 will hereby be secured by the wound threads 28. The carbon fibre thread 28 is wetted with glue via passage through a gluing apparatus 32 which is disposed close to the mandrel 22. The carbon fibre thread 28 is unrolled from a roll 34. The carbon fibre thread 28 is passed around a pulley 40 before the carbon fibre thread 28 is passed in through the gluing apparatus 32. The gluing apparatus 32 is fastened to a slide 38 which can slide back and forth on a rail 36. Two rolls of thread 34 are disposed in the slide 38 and may rotate about each their vertical-axis (not shown). The mandrel 22 rotates about its own longitudinal axis 24. The gluing apparatus 32 is fastened to the slide 38 which simultaneously with the rotation of the mandrel about its own longitudinal axis 24 is moved in parallel along rail 36 with the longitudinal axis 24 of the mandrel. Hereby is achieved the opportunity of covering all surfaces. In addition, the direction of orientation of the threads in relation to the longitudinal axis 24 of the mandrel may be controlled by the speed of the slide 38 along rail 36 relative to the rotational speed of the mandrel. When the slide 38 is moving slowly relative to the rotational speed of the mandrel, the threads 28 will be oriented almost perpendicularly to the longitudinal axis 24 of the mandrel. When the slide 38 is moved rapidly relative to the rotational speed of the mandrel, the threads 28 will be oriented almost in parallel with the longitudinal axis 24 of the mandrel. By varying the speed of the slide along rail 36 relative to the rotational speed of the mandrel, there is achieved the possibility of providing a very strong weaving with threads 28 oriented in various directions.

It is to be emphasised that many rolls of threads can be used simultaneously. Furthermore, it is possible to place the thread rolls in a magazine located some distance from the slide in direction away from the mandrel. The slide will thus gather the threads and move them in desired direction relative to the mandrel. The threads may thus be wetted in glue and wrapped around the rotating mandrel. In that way it becomes possible to use a large number of threads at the same time, and therefore there will be many options for varying the way in which threads are wound around the mandrel.

Figure 4:
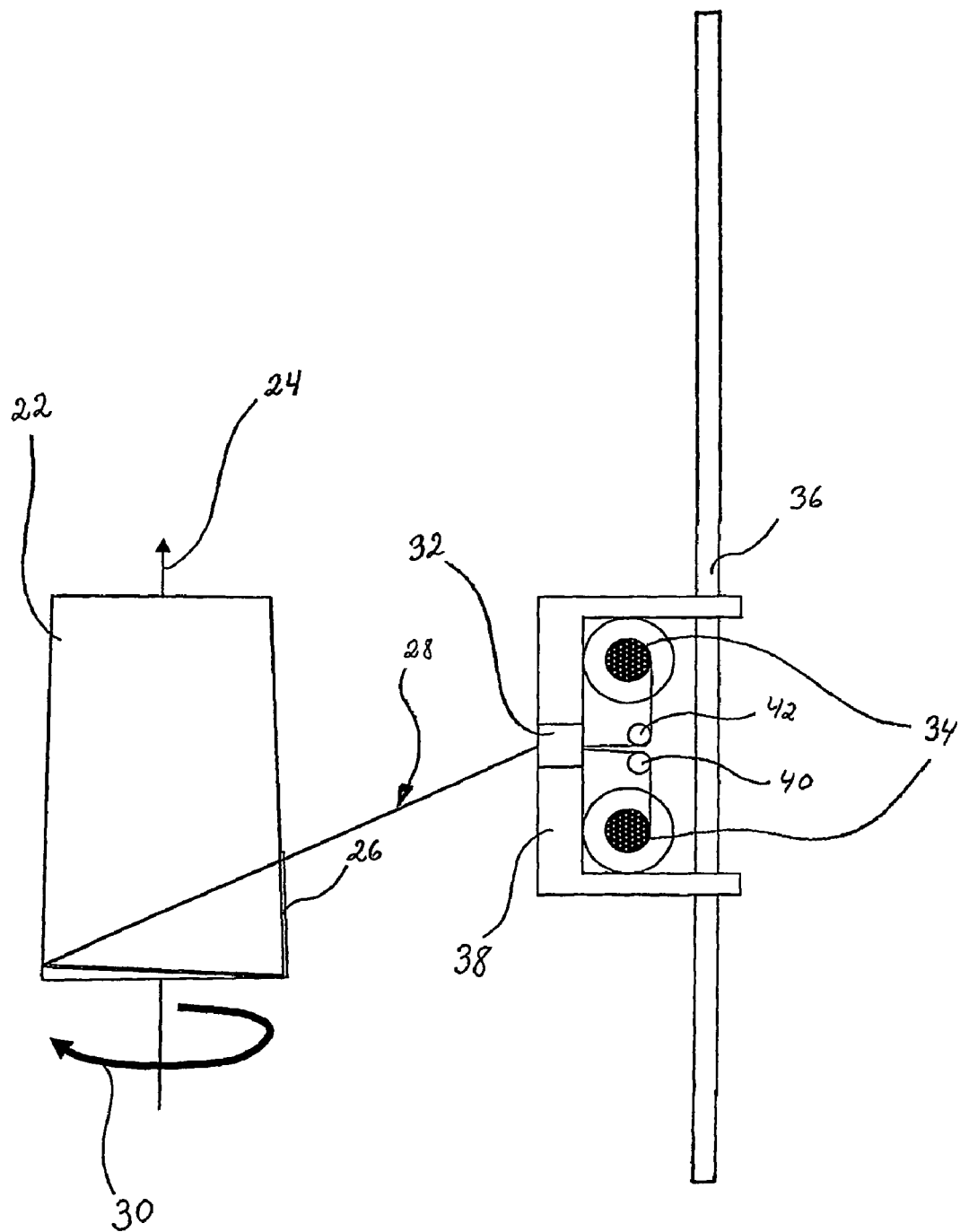
FIG. 4 shows a mandrel about which two threads are wound.

FIG. 4 shows the embodiment shown in FIG. 3 where the slide 38 is moved along rail 36 in parallel with the longitudinal axis 24 of the mandrel. In connection with the winding, there are used threads 28 from two thread rolls 34 which are provided on the slide 38. The two threads 28 are passed around each their pulley 40, 42 before the threads 28 are passed through the gluing apparatus 32.

The body may advantageously be cured after the winding. This may e.g. occur under heating. Then the body may be drawn off the mandrel 22, after which the ends of the body may be cut off at suitable angles, so that the rear end and the front end may be closed with plates (not shown). These plates may advantageously contain carbon fibres.

As carbon fibres 28 alone have inferior armouring properties, an armouring material 26 is applied during the winding process and thus integrated into the body. According to need, elements (not shown) of e.g. aluminium may be placed on the mandrel 22 at the areas where e.g. wheel suspensions (not shown) are to be mounted. These elements are hereby glued into the body during the winding process. Subsequently, through-holes are to be established, and the areas are to be cleaned from carbon fibres 28. The body may subsequently be coated with e.g. paint. The body will then be ready for mounting of e.g. wheel suspension, motor, gearbox and additional armouring.

The invention claimed is:

1. A method for making a vehicle (2), including a body comprising carbon fibres (28), where the body is wound up on a rotating mandrel (22) with threads (28) from rolls of threads used simultaneously and wetted in glue, where the threads are guided through a gluing apparatus fastened to a slide being moved in parallel with a longitudinal axis of the mandrel, where the way the threads are wound around the mandrel is varied, by varying the speed of the slide relative to the rotational speed of the mandrel, thereby providing a very strong weaving with threads (28) oriented in various directions, where the threads (28) contain carbon fibres, where the threads (28) wound around the mandrel (22), are subsequently cured, where, after the curing, the body is drawn off the mandrel (22), where the front end and rear end of the body are closed with closure elements, wherein the ends of the body are cut off at appropriate angles, and that the closure elements contain carbon fibres and armouring materials and that during the winding process, one or more layers of light weight ceramic and/or other armouring materials (26) are laid in which thereby become integrated in the basic body.

2. Method according to claim 1, further comprising adding mountings before, during or after winding the body wherein the body is subsequently surface treated.

3. Method according to claim 2, wherein after the surface treatment of the body, mounting elements are fitted on the mountings.

4. Method according to claim 1, wherein the vehicle (2) is a military vehicle.

5. Method according to claim 1, wherein the vehicle (2) is an armoured military vehicle.

6. Method according to claim 1, wherein the carbon fibers are prestressed carbon fibers.

7. Method according to claim 1, wherein increasing speed of the slide increases angles of the threads to a plane perpendicular to the axis of mandrel.

8. Method according to claim 1, wherein decreasing speed of the slide decreases angles of the threads to a plane perpendicular to the axis of mandrel.

* * * * *